United States Patent [19]

Bergeron

[11] Patent Number: 4,688,754
[45] Date of Patent: Aug. 25, 1987

[54] END ASSEMBLY FOR CONTROL VALVES

[75] Inventor: Ned Bergeron, Houma, La.

[73] Assignee: B.W.B. Controls, Inc., Houma, La.

[21] Appl. No.: 887,234

[22] Filed: Jul. 18, 1986

[51] Int. Cl.[4] .............................................. F15B 13/04
[52] U.S. Cl. ................. 251/63.5; 137/625.66; 251/63.6
[58] Field of Search ................. 92/13.6, 128; 137/615, 137/625.66; 251/63.5, 63.6; 285/190

[56] References Cited

U.S. PATENT DOCUMENTS

| | | | |
|---|---|---|---|
| 2,459,643 | 1/1949 | Hartley | 285/190 |
| 3,323,546 | 6/1967 | Lord | 285/190 X |
| 3,877,484 | 4/1975 | Theriot et al. | 137/625.66 |
| 4,121,615 | 10/1974 | Bergeron | 137/625.66 X |

FOREIGN PATENT DOCUMENTS

| | | | |
|---|---|---|---|
| 1296851 | 5/1962 | France | 285/190 |
| 343969 | 2/1960 | Switzerland | 285/190 |

Primary Examiner—Gerald A. Michalsky
Attorney, Agent, or Firm—George A. Bode

[57] ABSTRACT

An end assembly for a control valve adapted for receiving fluid under pressure, comprising: a valve body having a central bore therethrough; a sleeve member at least partially inserted in one end of the valve body and having a first port therethrough, the port being in fluid communication with the obre in the valve body; a collar member rotatably mounted to the sleeve and having a second port therethrough, the second port being in fluid communication with a source of fluid under pressure and the first port through the sleeve member; and a cap sealing insertable within the sleeve.

1 Claim, 3 Drawing Figures

END ASSEMBLY FOR CONTROL VALVES

BACKGROUND OF THE INVENTION

1. Field of the Invention

The present invention relates to an end assembly for control valves and, more particularly, to a sleeve, collar and cap end assembly that can be removed from the valve body without disconnecting and tubing and its fitting, thus saving time in maintenance operations.

2. General Background

Valves of the type shown by reference to U.S. Pat. Nos. 3,963,050, 3,877,484, 4,094,340 and 4,121,615 normally provide an end cap with an instrument fluid inlet port therein to which tubing, for supplying instrument fluid under pressure thereto, is threadably attached. To perform maintainence on the valve the tubing and its fitting must be removed and then the end cap must be removed. The apparatus of the present invention avoids the need for this timely pre-maintenance procedure by eliminating the need to disconnect the tubing and its fitting from the instrument inlet port before removing the end cap.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
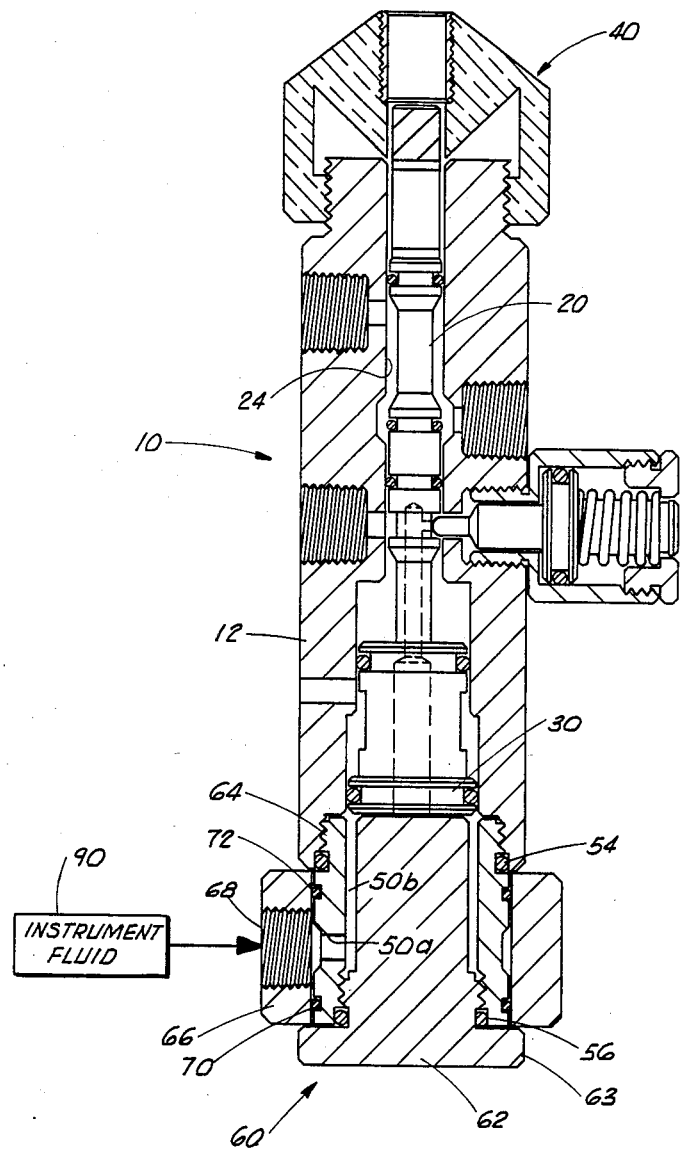
FIG. 1 is a cross sectional view of the apparatus of the present invention applied to one type of control valve.
Figure 2:
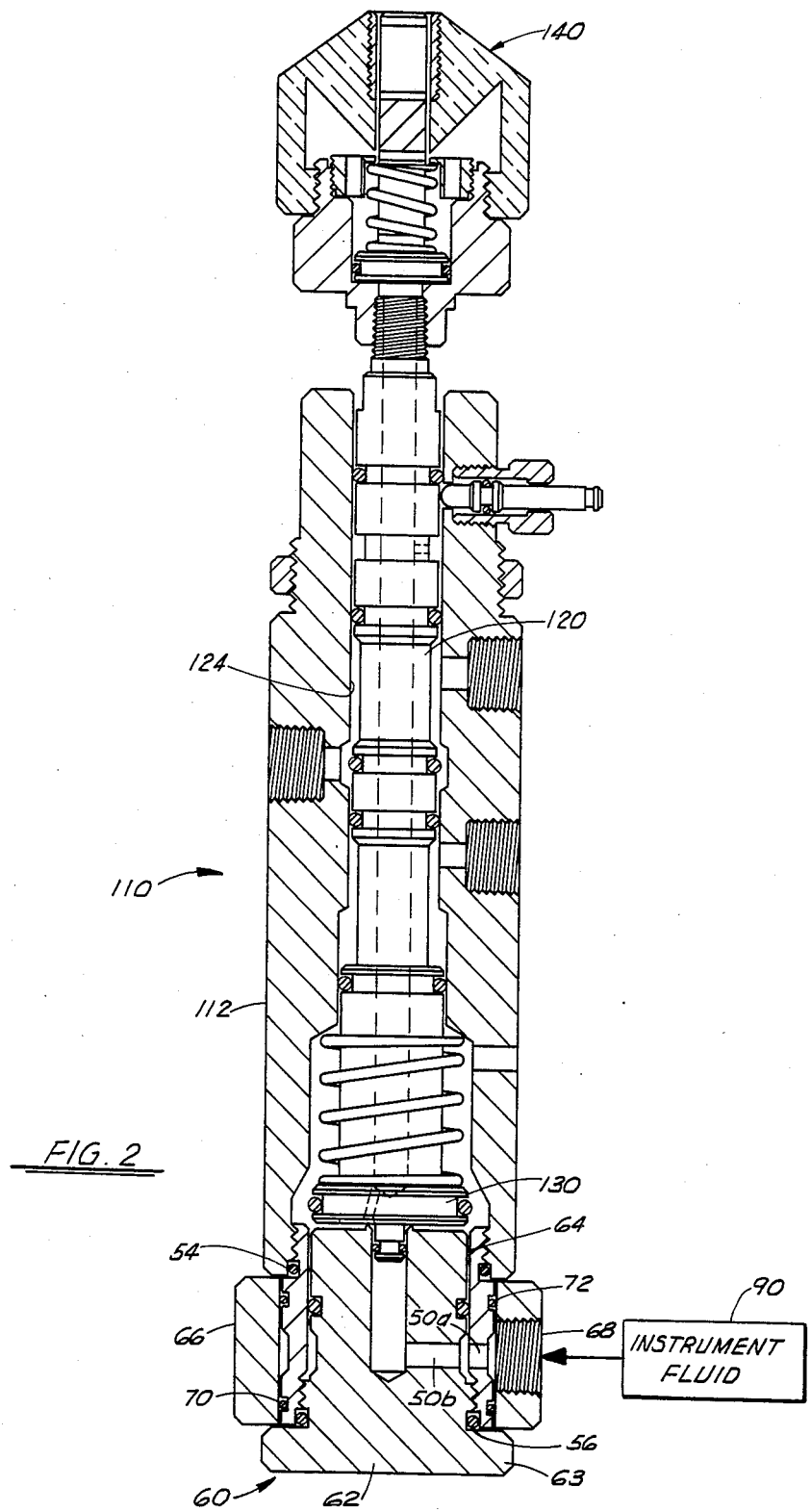
FIG. 2 is a cross sectional view of the apparatus of the present invention applied to a second type of control valve.
Figure 3:
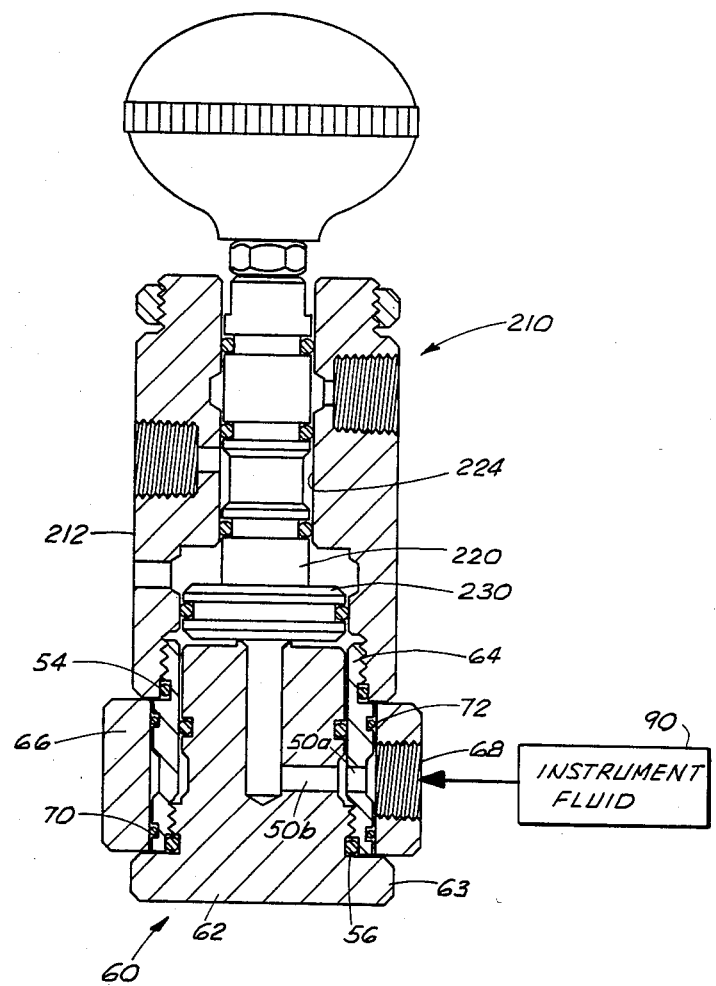
FIG. 3 is a cross sectional view of the apparatus of the present invention applied to yet another type of control valve.

Referring now to the drawing, and in particular FIGS. 1-3, the apparatus of the present invention is designated generally by the numeral 60. Conventional pilot relay or control valves 10, 110 and 210 have respective stems 20, 120 and 220 slidable within the bores 24, 124, 224 respectively thereof. Stems 20, 120 and 220 have pistons 30, 130 and 230 mounted respectively thereon for receiving instrument fluid under pressure 90 on the lower face thereof. Instrument pressure is provided to the bottom or "butt" end of the valves by instrument fluid under pressure 90 through a tubing (not shown) connected to fluid inlet port 68 (by a conventional fitting) communicating with the bore of the valve bodies 12, 112 and 212 through inner inlet 50. Conventional sealing, as discussed further herein, is provided by various O-ring seals.

To the internally threaded base of cylindrical valve bodies 12, 112 and 212 is threadably attached sleeve 64 having an externally threaded upper portion. O-ring seals 54 provide sealing between the valve bodies and sleeve 64. Rotatable collar 66, being of an internal diameter only slightly greater than the external diameter of sleeve 64, is then slipped over sleeve 64 producing a snug fit. O-ring seals 70, 72 provided annularly in the outside wall of sleeve 64 prevent leakage between sleeve 64 and collar 66. Sleeve 64 is also internally threaded at its lower end portion for threadably receiving externally threaded end cap 62. End cap 62 has annular shoulder portion 63 which overlaps sleeve 64 and collar 66 to complete the valve assembly. O-ring seals 56 prevent fluid leakage between sleeve 64 and cap 62.

Instrument fluid is provided to the bore of valve 10, 110 and 210 through threaded inlet port 68 provided in collar 66 aligning with inlet port 50 in sleeve 64 and end cap 62 (50a in sleeve 64 and 50b in end cap 62). The apparatus of the present invention has eliminated the inlet port normally found in end cap 62.

With valves 10, 110 and 220 installed and operating, maintenance is simple - tubing (not shown) threadably connected to threaded inlet 68 need not be removed as only end cap 62 need be threadably removed from its connection with sleeve 62 so as to remove stems 20, 120 and 220 from valve bodies 12, 112 and 212 respectively.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An end assembly for a control valve having a valve body, said valve body having a central bore therethrough, and a valving member movable therein from a first position to a second position and adapted for receiving fluid under pressure, comprising:

(a) a sleeve member at least partially inserted in one end of said valve body and having a first port therethrough, said port being in fluid communication with said bore in said valve body;

(b) a collar member rotatably mounted about said sleeve member and having a second port therethrough, said second port being in fluid communication with a source of fluid under pressure and said first port provided through said sleeve member; and (c) a cap member having a portion thereof sealing insertable within said sleeve member, said portion having a third port therethrough in fluid communication with said bore and said first port provided in said sleeve member.

* * * * *